US000001491H

United States Statutory Invention Registration [19]

[11] Reg. Number: H1491

Ivey et al.

[43] Published: Sep. 5, 1995

[54] BROAD BAND, HIGH FREQUENCY, HIGH SENSITIVITY BEAM FORMING ARRAY

[75] Inventors: Larry E. Ivey; James A. Tims, both of Orlando, Fla.

[73] Assignee: Government of the United States, Washington, D.C.

[21] Appl. No.: 291,645

[22] Filed: Aug. 15, 1994

[51] Int. Cl.[6] ..... H04B 13/00

[52] U.S. Cl. ..... 367/154; 367/153; 367/162; 367/176

[58] Field of Search ..... 367/153, 154, 162, 176

*Primary Examiner*—Ian J. Lobo

*Attorney, Agent, or Firm*—Thomas E. McDonnell; Charles J. Stockstill

[57] ABSTRACT

A sonar array which is operable at a broad range of frequencies, has a high free-field voltage sensitivity and is operable at high hydrostatic pressures. The array includes sensor elements made of a piezoelectric material, a backing plate which supports the sensor elements, a dielectric-elastic insulator positioned between the sensor elements and the backing plate, and backing blocks corresponding, respectively, to the sensor elements, each backing block positioned between a corresponding sensor element and the insulator. The sensor elements are arranged in staves, the staves forming four separate quadrants, the sensor elements in each stave being arranged in parallel and series combinations, so that the sonar array is operable between a frequency range of 10 kHz to above 100 kHz, each stave has a free-field voltage sensitivity of −186 dB re 1V/μPa or greater between the frequency range and the free-field voltage sensitivity does not change more than plus or minus 2 dB at hydrostatic pressures varying from 20 to 4481.6 kPa.

19 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BROAD BAND, HIGH FREQUENCY, HIGH SENSITIVITY BEAM FORMING ARRAY

BACKGROUND OF THE INVENTION

1. Field of the Invention

The present invention relates to beam forming acoustic arrays and, more particularly, to broad band, high frequency, high sensitivity beam forming acoustic arrays operable at high hydrostatic pressure.

2. Description of the Related Art

A conventional sonar system typically utilizes a broad band, high frequency, high sensitivity beam forming array as an antenna. The specific array design is dependent on the particular array application. For example, the array design can be varied to meet specific free-field voltage sensitivity requirements and hydrostatic pressure requirements while being operable over a defined frequency range.

Conventional acoustic arrays having multiple sensor elements use a piezoelectric material such as lead zirconate-lead titanate (PZT) which requires a pressure release material to surround and back each of the sensor elements of the array. Although this type of array design will met all acoustic design constraints, such arrays fail to met the hydrostatic restraints because of the pressure release material. The use of the array in high pressure environments causes the pressure element to be compressed. As a result, the pressure release material expands and presses against the sensor elements causing an acoustic coupling that deteriorates the array performance.

Therefore, conventional arrays do not meet the more demanding underwater performance parameters. For example, conventional arrays are not able to operate from 10 kHz to above 100 kHz, while having a free-field voltage sensitivity (FFVS) of −186 dB re 1V/μPa or greater wherein the FFVS does not change more than plus or minus 2 dB at hydrostatic pressures varying from 20 to 4481.6 kPa (3 to 650 psi).

SUMMARY OF THE INVENTION

Accordingly, it is an object of the present invention to provide an array which is operable at a broad range of frequencies, has a high free-field voltage sensitivity (FFVS) and is operable at high hydrostatic pressures.

It is a further object of the present invention to provide an array which is operable between a frequency range of 10 kHz to above 100 kHz and has a free-field voltage sensitivity (FFVS) of −186 dB re 1V/μPa or greater between the frequency range, where the FFVS cannot change more than plus or minus 2 dB at hydrostatic pressures varying from 20 to 4481.6 kPa (3 to 650 psi).

Additional objects and advantages of the invention will be set forth in part in the description which follows and, in part, will be obvious from the description, or may be learned by practice of the invention.

The objects of this invention are achieved by providing an array comprising sensor elements made of lead titanate, a backing plate which supports the sensor elements, a dielectric-elastic insulator positioned between the sensor elements and the backing plate, and backing blocks corresponding, respectively, to the sensor elements, each tungsten backing block positioned between a corresponding sensor element and the insulator. The sensor elements are arranged in staves, the staves forming four separate quadrants, the sensor elements in each stave being arranged in parallel and series combinations, so that the sonar array is operable between a frequency range of 10 kHz to above 100 kHz, each stave has a free-field voltage sensitivity of −186 dB re 1V/μPa or greater throughout the frequency range and the free-field voltage sensitivity cannot change more than plus or minus 2 dB at hydrostatic pressures varying from 20 to 4481.6 kPa.

DESCRIPTION OF THE PREFERRED EMBODIMENTS

Figure 1:
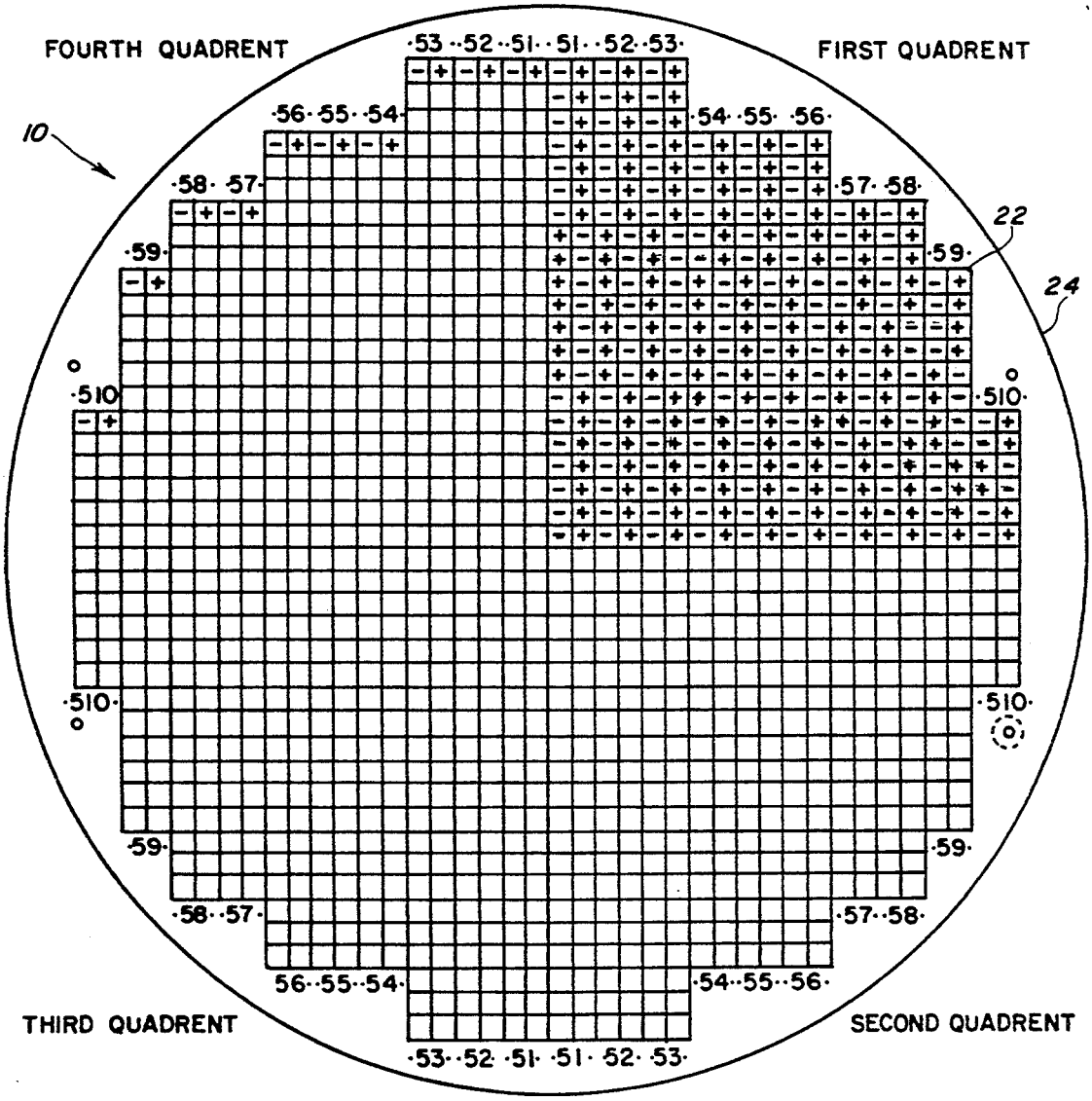
FIG. 1 shows the arrangement of sensor elements of an array according to an embodiment of the present invention.

Reference will now be made in detail to the present preferred embodiments of the present invention, examples of which are illustrated in the accompanying drawings, wherein like reference numerals refer to like elements throughout.

In the preferred embodiment, shown in FIG. 1, a passive, high frequency array 10 designed for operation at frequencies between 10 and 100+ kHz, and pressures of up to 4481.6 kPa (650 psi) is comprised of a circular backing disk 24 supporting sensor elements 22 is mounted in a cylindrical stainless steel housing (not illustrated) with a raised rim (not illustrated). Array 10 is divided into four quadrants, each quadrant populated by three hundred and thirty sensor elements 22, for a total of 1,320 sensor elements 22. Each quadrant is divided into ten separate staves S1–S10. Each stave S1–S10 of each quadrant is two sensor elements wide and six to twenty-one elements long. Therefore, each stave S1–S10 can be described as divided into columns and rows, there being two columns in each stave S1–S10, where each column has a width of one sensor element and each row includes at least six and no more than twenty-one sensor elements. Each sensor element 22 is a piezoelectric ceramic square, preferably lead titanate. Although the size of each ceramic square is dictated by the space available to the designer preferably, each ceramic square is 1.22 cm (0.48 in.) on a side. Although not illustrated in FIG. 1, each sensor element 22 is preferably separated from adjacent sensor elements by a gap, preferably 0.015 cm (0.02 in.) on one direction and 0,127 cm (0.05 in.) in the other direction. Sensor elements 22 are arranged in rectangular groups forming a staggered pattern within the respective quadrants.

The array 10, including each sensor element 22, is covered, protected and enclosed by a dome or cover (not illustrated). The dome is made of a material having a sound speed and a density approximately equal to that of water with its interior space filled with oil. The oil may be of any type having a sound speed and density approximately equal to that of water. Therefore, acoustic waves passing through water easily penetrate the dome and the oil, thereby reaching sensor elements 22 without being noticeably affected by the dome or the oil. Such dome construction, and the use of oil inside of the dome, is well-known in the art.

Sensor elements 22 in the first quadrant have either a positive "+" polarity or a negative "−" polarity. Although FIG. 1 only illustrates the polarity of sensor elements 22 in the first quadrant, each sensor element 22 in array 10 has a specific polarity.

The arrangement of the polarity of respective sensor elements 22, and the arrangement of parallel and series combinations of sensor elements 22 within an array 10 can be varied to balance the capacitance and the sensitivity of the array 10. As is well-known in the art, array sensitivity increases and capacitance decreases when sensor elements 22 are connected in series. In contrast, sensitivity decreases and capacitance increases when sensor elements 22 are connected in parallel. In this manner, an array designer can manipulate the polarities and serial and parallel arrangements of the sensors 22 to strike a balance between capacitance and sensitivity. Such design techniques are well-known in the art and will not be described further herein.

Figure 2:
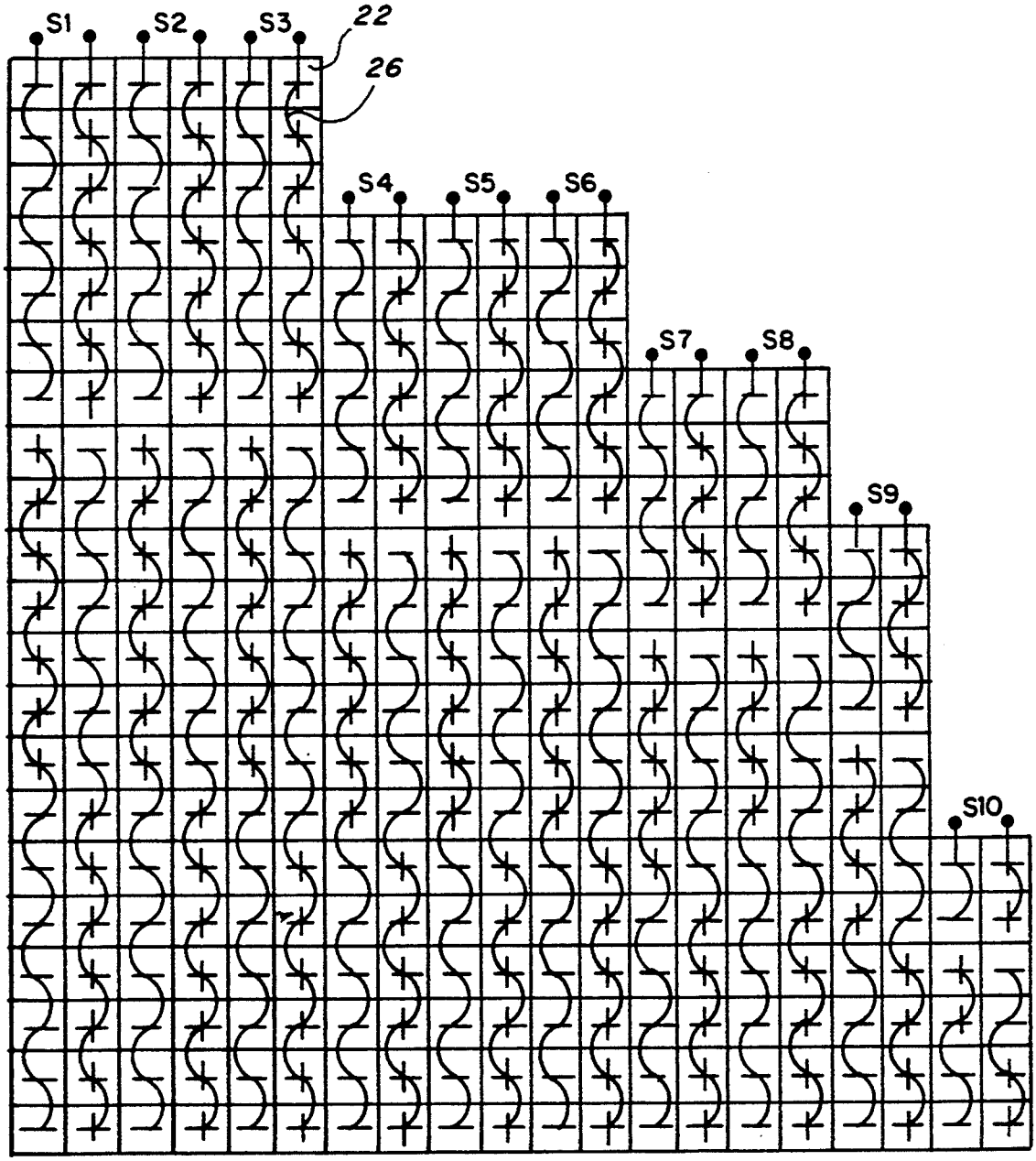
FIG. 2 shows the sensor element polarity of one quadrant of the array.
Figure 3:
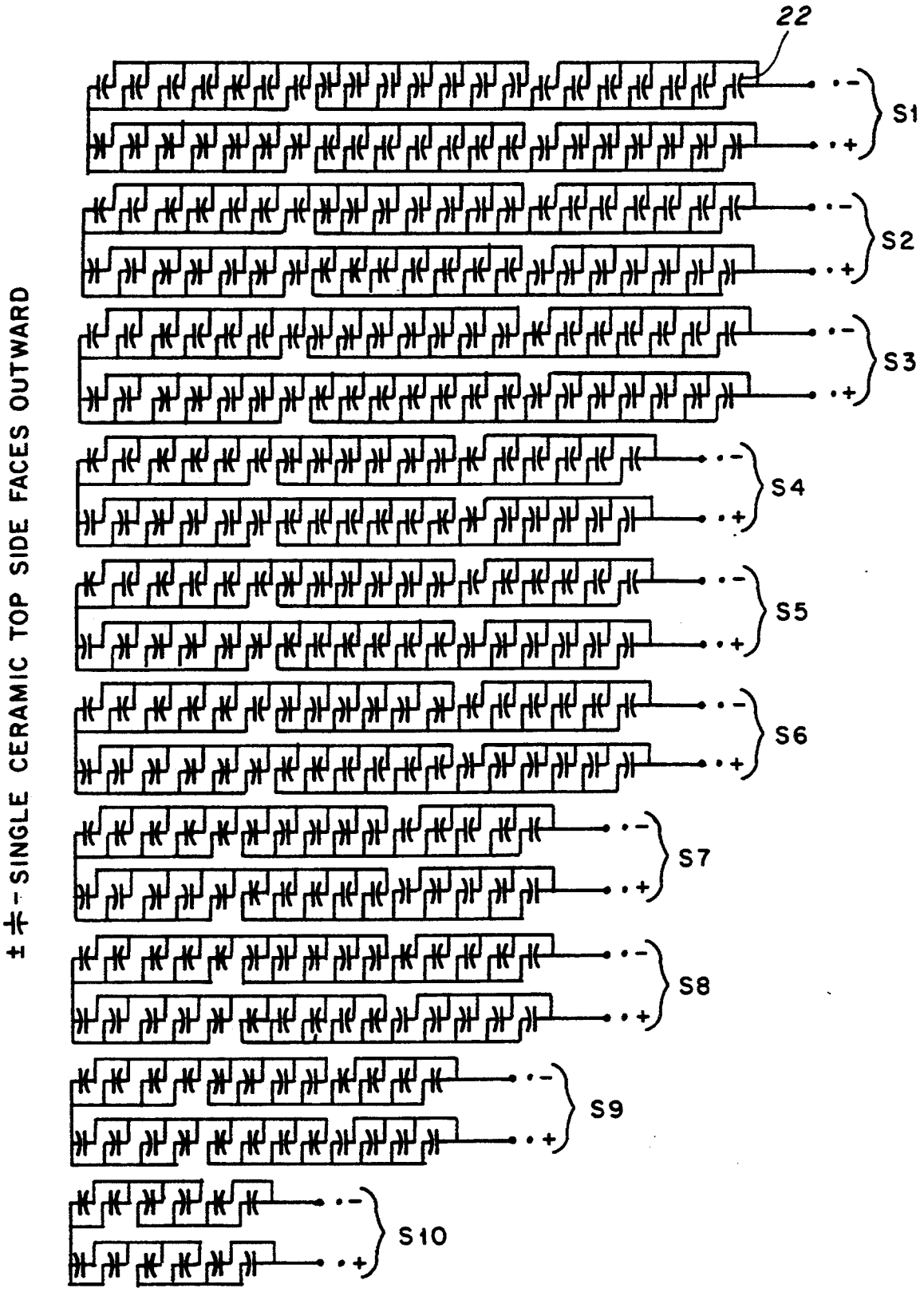
FIG. 3 shows the series and parallel connections of sensor elements in one quadrant of the array.
Figure 4:
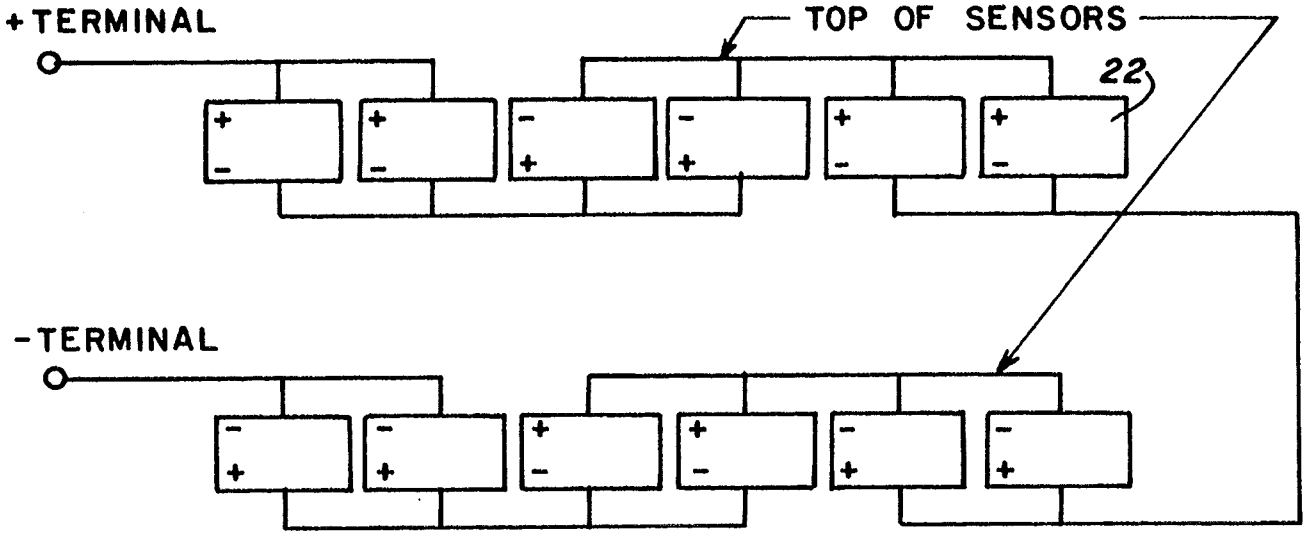
FIG. 4 shows the sensor elements in one stave of the array.

FIG. 2 shows the first quadrant of array 10 in detail. Sensor elements 22 are connected together by cabling 26 either in a serial or parallel arrangement within a respective stave S1–S10 of a respective quadrant to provide a specific frequency response. FIG. 3 shows the series and parallel connections of sensor elements 22 in the first quadrant of array 10, according to an embodiment of the present invention. FIG. 4 shows a sensor schematic of sensor elements 22 in stave S10 of the first quadrant of array 10, according to an embodiment of the present invention.

Each quadrant of array 10 is identically configured. The configuration illustrated in FIGS. 2, 3, and 4 allows array 10 to meet the required specifications of being operable between a frequency range of 10 kHz to above 100 kHz and having a free-field voltage sensitivity (FFVS) of −186 dB re 1V/μPa or greater between the frequency range, where the FFVS cannot change more than plus or minus 2 dB at hydrostatic pressures varying from 20 to 4481.6 kPa (3 to 650 psi).

Figure 5:
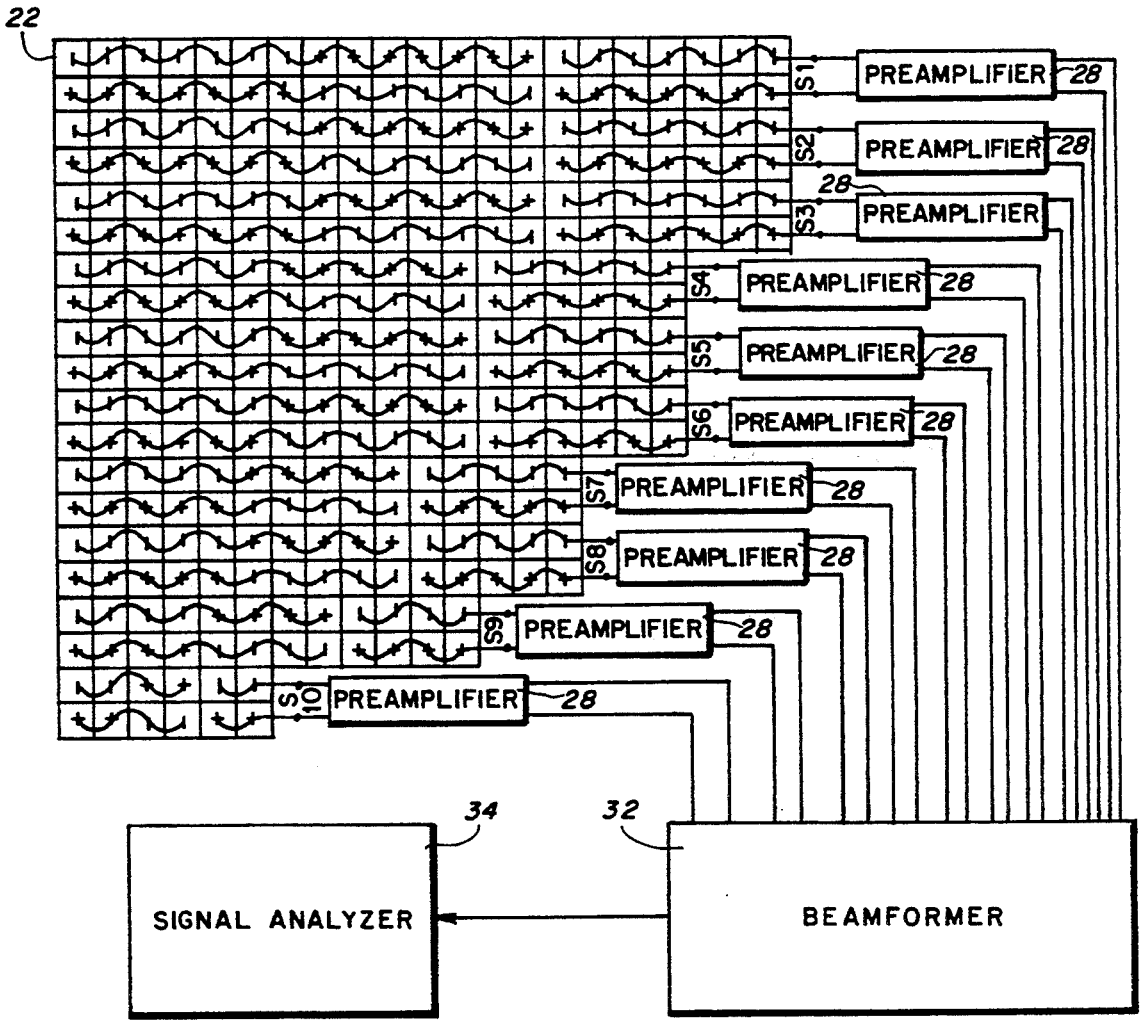
FIG. 5 shows one quadrant and associated electronics of the array.

The embodiment of the present invention illustrated in FIG. 5 is a "passive" array, that is, array 10 is designed only to receive signals. Each stave S1–S10 is individually wired with respect to the other staves and is connected to a separate, respective, low-noise preamplifier 28. Each preamplifier 28 is electrically connected to a beamformer 32. Amplifier, beamformer 32 forms a beam in a desired beam shape and steers the beam by individually connecting and disconnecting respective staves S1–S10. Beamformer 32 receives the amplified signals of each stave S1–S10 via preamplifiers 28. A signal from beamformer 32 is output to a signal analyzer 34 for analyzing an output signal from beamformer 32. Beamformer 32 and signal analyzer 34 devices are well-known in the art and will not be discussed further herein.

Because each quadrant is configured in the same manner in the present embodiment, FIG. 5 represents the configuration of all sensor 10 quadrants.

As described above, the embodiment of the present invention 4 is an array 10 described as a "passive" array, that is, array 10 is designed for "receiving". However, an additional embodiment of the present invention is an "active" array 10, that is, an array 10 designed for "transmitting". Whether array 10 is active or passive depends on the associated electronics and, more particularly, whether or not preamplifiers 28 are coupled to array 10. If preamplifiers 28 are coupled to sensor elements 22, array 10 cannot transmit and can only be used as a passive array. If preamplifiers 28 are not connected to array 10, array 10 can transmit. Array 10 can be used both passively and actively as the sole antenna in a sonar system if a switching mechanism (not illustrated) is used to couple each preamplifier 28 to array 10 when receiving and to decouple each preamplifier 28 from array 10 when transmitting. Such coupling and decoupling of preamplifiers 28 to an array 10 is well-known in the art.

Figure 6:
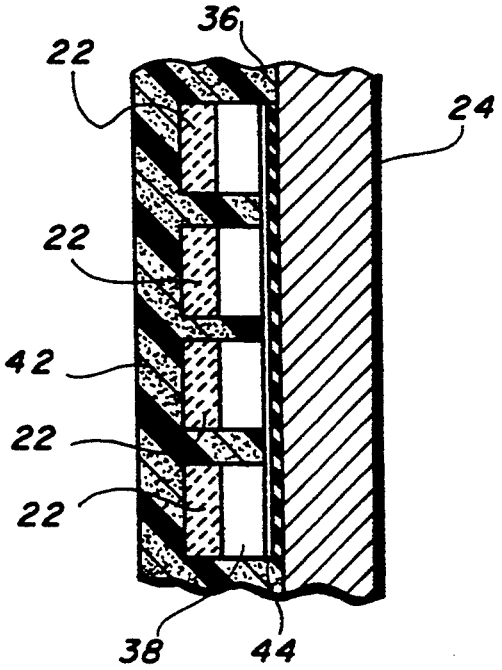
FIG. 6 shows the specific construction of a sensor element arrangement.

FIG. 6 shows the specific construction of the sensor elements 22 of array 10. As stated above, each sensor element 22 is made of a piezoelectric material, such as lead titanate. A thin dielectric-elastic strip 36, such as butyl rubber, is sandwiched between each sensor element 22 and backing disc 24. The dielectric-electric strip 36 provides electrical insulation between sensor elements 22 and backing disc 24, as well as acoustic isolation to prevent excitation of vibrational modes in backing disc 24. A backing block 38, preferably tungsten, is connected between each sensor element 22 and backing disc 24 to minimize back radiation. An elastomer layer 42 covers and encapsulates each sensor element 22. The elastomer layer 42 dampens spurious resonances and provides for a more rugged array construction. An expanded metal foil electrode 44, preferably Nickel 200, is positioned between dielectric-electric strip 36 and backing block 38.

Lead titanate, used as the sensor material, has a low "$g_{31}$" constant and does not require a pressure release material in the array design. Therefore, lead titanate offers excellent sensor element/array sensitivity, a smooth array response within the required frequency range, stability with maximum required hydrostatic pressure, and good stave capacitance allowing low noise measuring capability. The use of lead titanate, without the use of a pressure release material does not encounter the problems of the prior art.

Butyl rubber, forming dielectric-elastic strip 36, is a general purpose, non-oil resistance elastomer resulting from the copolymerization of isobuthylene and isoprene. Butyl rubber offers outstanding permeation resistance to both gases and water. Further, butyl rubber has excellent dielectric properties and electrical insulation resistance due to the fact that it is a non-polar hydrocarbon rubber. Additionally, its resistance to heat, ozone and weathering make it attractive for electrical applications. Other notable characteristics of butyl rubber include its good abrasion resistance and high internal damping. The high internal damping of butyl rubber makes butyl rubber particularly attractive for shock and vibration applications. Butyl rubber is well-known in the art. Additional information regarding butyl rubber can be found in R. N. Capps, C. M. Thompson and F. J. Weber, *Handbook of Sonar Transducer Passive Materials*, Naval Research Laboratory (NRL) Memorandum Report No. 4311, pages 34–35 (Oct. 30, 1981), and in R. N. Capps, *Elastomeric Materials for Acoustical Applications*, an update to Naval Research Laboratory (NRL) Memorandum Report No. 4311, pages 105–106 (Sept. 15, 1989) both incorporated by reference herein.

The elastomer layer 42 is preferably polyurethane. A number of commercially available liquid casting polyurethanes designed for use as electrical molding and potting compounds have been used for underwater acoustic applications. The majority of these materials are considered to be proprietary compounds, so that their exact compositions are unknown. However, the compounds are made by many manufacturers. The "PR" series is manufactured by Courtaids Aerospace, formerly Products Research and Chemicals, while a Conathane ® EN series is manufactured by Conap, Inc. Additional information regarding polyurethanes can be found in R. N. Capps, *Elastomeric Materials for Acoustical Applications,* an update to Naval Research Laboratory (NRL) Memorandum Report No. 4311, pages 189–192, 204 (Sept. 15, 1989) also incorporated by reference herein.

Although a few preferred embodiments of the present invention have been shown and described, it would be appreciated by those skilled in the art that changes may be made in these embodiments without departing from the principles and spirit of the invention, the scope of which is defined in the claims and their equivalents. For example, the array size can be smaller or larger in size and number of sensor elements.

What is claimed is:

1. An acoustic beam forming array comprised of:

means for sensing acoustic waves generated by variations in hydrostatic pressures in a surrounding medium between a frequency range of 10 kHz to 100 kHz and having a free-field voltage sensitivity of at least −186 dB re 1V/μPa; and means for protecting said sensing means from physical damage having a sound speed and density approximately equal to that of water so that acoustic waves reach said sensing means without being noticeably affected by said protecting means.

2. An array, as in claim 1, wherein said sensing means is a plurality of sensing elements structures.

3. An array, as in claim 2, wherein said each sensing element structures of the plurality of sensing element structures are further comprised of a sensing element, support means and a dielectric-elastic insulator positioned between each sensing element of the plurality of sensing elements and the support means.

4. An array, as in claim 3, wherein the sensing element is a piezoelectric material.

5. An array, as in claim 4, wherein the piezoelectric material is lead titanate.

6. An array, as in claim 3, wherein the dielectric-elastic insulator is buytl rubber.

7. An array, as in claim 3, wherein said support means is further comprised of a plurality of backing blocks corresponding, respectively, to the sensing elements, each backing block positioned between a corresponding sensor element and the insulator.

8. An array, as in claim 7, wherein the backing blocks are metal.

9. An array, as in claim 8, wherein the metal is tungsten.

10. An array, as in claim 3, wherein the sensor elements are arranged in staves, the staves forming four separate quadrants of the array, the sensor elements in each stave being arranged in parallel and series combinations, so that the array operates between a frequency range of 10 kHz to above 100 kHz, each stave having a free-field voltage sensitivity of −186 dB re 1V/μPa or greater between the frequency range.

11. An array, as in claim 10, wherein each quadrant contains ten staves, each stave is divided into columns and rows, with two columns in each stave, each column having a width of one sensor element and each row comprising at least six and no more than 21 sensor elements.

12. An array, as in claim 1, wherein the sensing means is passive.

13. An array, as in claim 1, wherein the sensing means is active.

14. An array, as in claim 1, wherein the sensing means is both active and passive.

15. An array, as in claim 1, wherein the protecting means is comprised of a dome having oil between the dome and the sensing means.

16. An acoustic beam forming array comprised of:

a plurality of passive sensing elements capable of sensing variations in hyrostatic pressures between a frequency range of 10 kHz to 100 kHz and having a free-field voltage sensitivity of at least −186 dB re 1V/μPa;

an plurality of insulators corresponding, respectively, to the plurality of sensing elements;

a plurality of backing blocks corresponding, respectively, to the plurality of sensing elements, each backing block positioned between a corresponding sensor element and the insulator; and said sensing element are arranged in staves, the staves forming four separate quadrants of the array, the sensor elements in each stave being arranged in parallel and series combinations, so that the array operated between a frequency range of 10 kHz to 100 kHz, each stave having a free-field voltage sensitivity of −186 dB re 1V/μPa or greater between the frequency range.

17. An array, as in claim 16, wherein each quadrant contains ten staves, each stave is divided into columns and rows, with two columns in each stave, each column having a width of one sensor element and each row comprising at least six and no more than 21 sensor elements.

18. An acoustic beam forming array comprised of:

a plurality of active sensing elements capable of sensing variations in hydrostatic pressures between a frequency range of 10 kHz to 100 kHz and having a free-field voltage sensitivity of at least −186 dB re 1V/μPa;

an plurality of insulators corresponding, respectively, to the plurality of sensing elements;

a plurality of backing blocks corresponding, respectively, to the plurality of sensing elements, each backing block positioned between a corresponding sensor element and the insulator;

said sensing element are arranged in staves, the staves forming four separate quadrants of the array, the sensor elements in each stave being arranged in parallel and series combinations, so that the array operates between a frequency range of 10 kHz to 100 kHz, each stave having a free-field voltage sensitivity of −186 dB re 1V/μPa or greater between the frequency range.

19. An acoustic beam forming array comprised of:

a plurality of sensing elements that are both active and passive which are capable of sensing variations in hydrostatic pressures between a frequency range of 10 kHz to 100 kHz and having a free-field voltage sensitivity of at least—186 dB re 1V/μPa;

an plurality of insulators corresponding, respectively, to the plurality of sensing elements;

a plurality of backing blocks corresponding, respectively, to the plurality of sensing elements, each backing block positioned between a corresponding sensor element and the insulator;

said sensing element are arranged in staves, the staves forming four separate quadrants of the array, the sensor elements in each stave being arranged in parallel and series combinations, so that the array operates between a frequency range of 10 kHz to 100 kHz, each stave having a free-field voltage sensitivity of −186 dB re 1V/μPa or greater between the frequency range.

* * * * *